United States Patent [19]

Pontes

[11] Patent Number: 4,469,288
[45] Date of Patent: Sep. 4, 1984

[54] EXPANSIBLE SHAFT WITH ACTUATOR RETAINING MEMBER AND SPHERICAL BEARING SURFACE

[75] Inventor: Virgil M. Pontes, N. Dighton, Mass.

[73] Assignee: Double E Company Inc., Brockton, Mass.

[21] Appl. No.: 470,142

[22] Filed: Feb. 28, 1983

[51] Int. Cl.³ .................... B65H 75/18; B65H 75/24
[52] U.S. Cl. ............................................. 242/72.1
[58] Field of Search .............. 242/72.1, 72 R, 68.2, 242/46.2, 46.3, 46.4; 279/2 R, 2 A; 308/233

[56] References Cited

U.S. PATENT DOCUMENTS

| | | | |
|---|---|---|---|
| 1,357,562 | 11/1920 | Hope | 308/233 |
| 2,345,246 | 3/1944 | Elka | 242/72.1 |
| 2,718,103 | 9/1955 | Wagner | 242/72.1 X |
| 3,331,565 | 7/1967 | Gerritts | 242/72.1 |
| 3,833,179 | 9/1974 | Maurer | 242/46.4 |
| 4,254,920 | 3/1981 | Peterson | 242/72.1 |

Primary Examiner—Stanley N. Gilreath

[57] ABSTRACT

An expansible shaft with an actuator having a bore through which the operating rod extends, and, adjacent one end of the actuator, a surface inclined relative to the rod which at least partially defines a recess extending radially outward of the bore. A retaining member is mounted in a recess in the outer surface of the rod in position for engaging the surface of the actuator recess so that, when the actuator is forced relative to the rod towards the retaining member, interaction between the retaining member and the surface of the actuator recess causes application of a radially inwardly directed force on the retaining member. A bearing surface at one axial end of the operating rod is defined by a portion of the exterior of a sphere and a drive screw engages and is arranged to apply force to the bearing surface.

20 Claims, 10 Drawing Figures

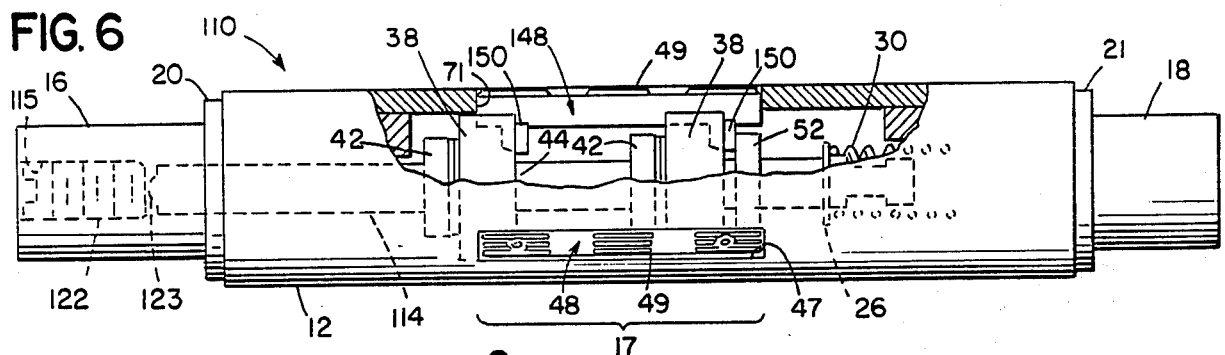
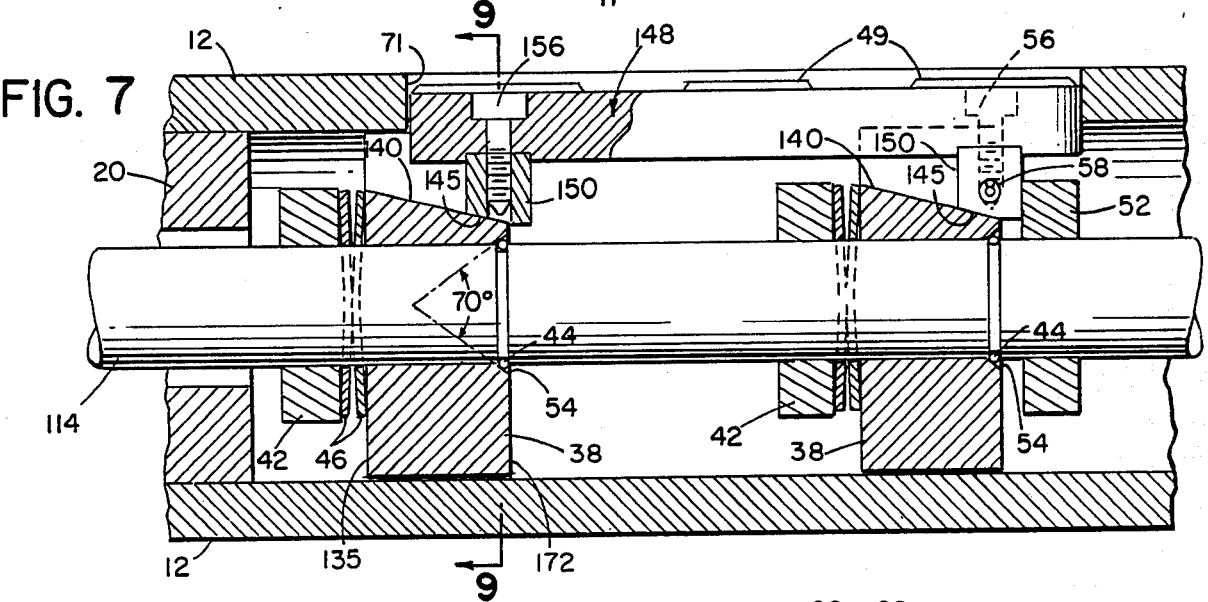
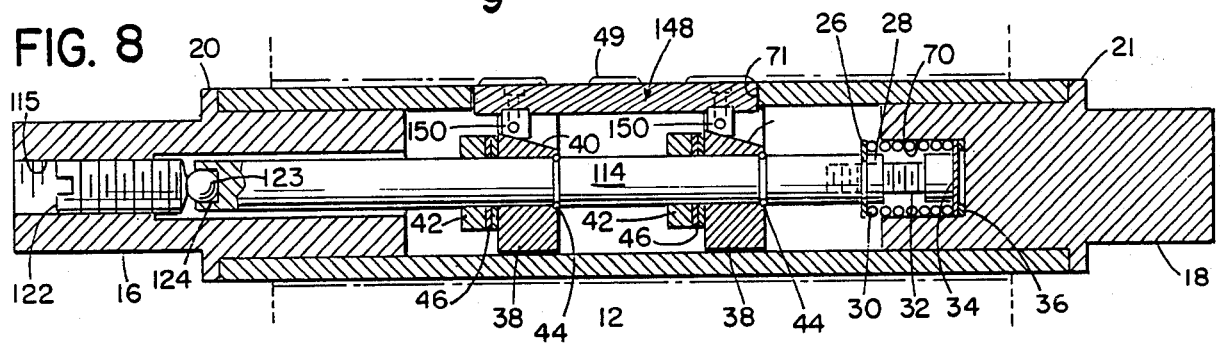
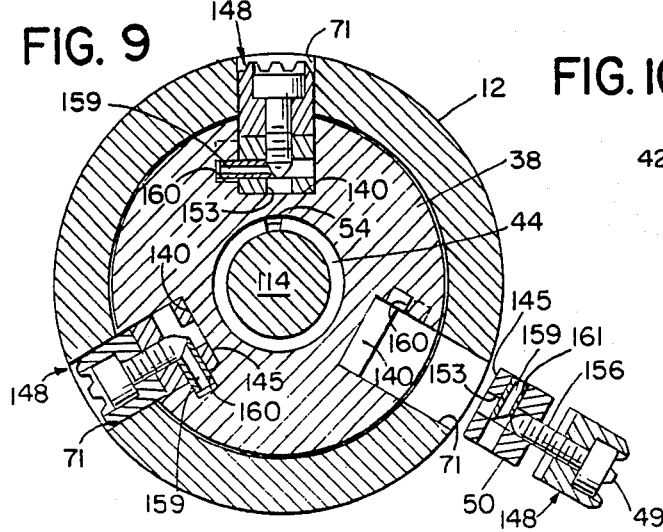
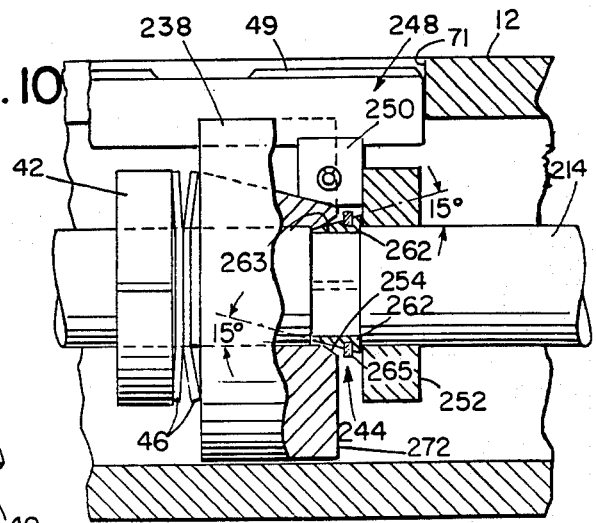

EXPANSIBLE SHAFT WITH ACTUATOR RETAINING MEMBER AND SPHERICAL BEARING SURFACE

BACKGROUND OF THE INVENTION

This invention relates to expansible shafts.

Such shafts have an axially extending housing and a core engager which moves radially from a retracted position within the housing to an expanded position in which the core engager extends beyond the outer housing wall. For example, Peterson U.S. Pat. No. 4,254,920 (assigned to the assignee of this application) discloses a fluid-actuated shaft having an operating rod that is mounted co-axially with and moves axially relative to the housing. Springs move actuators to force the core engagers radially outwardly into engagement with a surrounding core and a fluid-activated piston drives the operating rod in the other direction to retract them. There are also shafts which use mechanical means (e.g., Acme screws) to expand actuators.

Existing shafts are subject to various problems. For example, mechanism coupling the actuator and operating rod may jam or uncouple under high loads, relative rotation of the operating rod and other portions of the shaft may result in movement of the actuating screw, and misalignment of various moving parts in the shaft may cause wear and other operating difficulties.

It is desirable that the shaft should have a high load-carrying capacity; and also that the load capacity should not be adversely affected by flexing of the shaft under load.

CROSS-REFERENCE TO RELATED APPLICATIONS

The preferred embodiments described herein include several features which were invented either prior or subsequent to the present invention. Many of these features are the subject of other applications, copending with the present application, assigned to the assignee of the present application, and titled as follows:

MECHANICAL EXPANSIBLE SHAFT, U.S. Ser. No. 470,145 filed Feb. 28, 1983 in the name of Richard Edward Flagg;

CORE-ENGAGER RETAINER FOR AN EXPANSIBLE SHAFT, U.S. Ser. No. 485,111, filed Feb. 28, 1983 in the names of Virgil M. Pontes and Lawrence C. Young; and POSITIVE RETRACTING MECHANICAL EXPANSIBLE SHAFT, U.S. Ser. No. 470,143, filed Feb. 28, 1983 in the name of Lawrence C. Young.

The features which are the subject of the first of the above three applications were invented prior to the invention of the present invention.

SUMMARY OF THE INVENTION

The invention features generally, in one aspect, an expansible shaft with an actuator having a bore through which the operating rod extends, and, adjacent one end of the actuator, a surface inclined relative to the rod, which at least partially defines a recess extending radially outward of the bore. A retaining member is mounted in a recess in the outer surface of the rod in position for engaging the surface of the actuator recess so that, when the actuator is forced relative to the rod towards the retaining member, interaction between the retaining member and the surface of the actuator recess both limits relative movement and causes application of a radially-inwardly directed force on the retaining member, thereby insuring that the retaining member will not be forced out of the recess in the rod.

In preferred embodiments of this aspect, a countersink in the actuator which surrounds the bore defines a generally inward facing annular surface inclined at an angle not more than 45° (and preferably in the reign of 15°-30°) relative to the rod, and the retaining member is a generally annular discontinuous ring extending around not less than about 90% of the circumference of the operating rod in a circumferential groove in the outer surface of the operating rod.

The height of the ring above the outer surface of the rod is not substantially greater than (and in no event more than about twice) the depth of the groove.

According to this aspect of the invention, the actuator of the shaft is firmly maintained in position on the shaft relative to the core engager, so that inadvertant over-force applied to the operating rod will not cause the actuator retainer to slip or disengage from the rod, resulting in jamming or damage to the shaft—e.g., uncoupling of the core engager from the actuator.

In another aspect of the invention, a bearing surface at one axial end of the operating rod is defined by a portion of the exterior of a sphere, and the means for moving the rod axially in a predetermined direction comprises a moving member engaging and arranged to apply force to that bearing surface in a direction generally parallel to that predetermined direction. Preferably, the bearing surface is defined by a hard spherical bearing mounted in a recess at the end of the rod having a depth of not less than the spheres radius, and portions of the adjacent shaft end extend over the surface of the sphere to retain it in the recess. This aspect of the invention provides a constant, low-area contact between the operating rod and the rod-moving member.

Other features and advantages of the invention will be apparent from the following description of the preferred embodiment.

DESCRIPTION OF THE PREFERRED EMBODIMENTS

First, the drawings are briefly described.

Drawings:

FIG. 6 is a perspective view, partially broken away, of a second shaft showing the core-engaging sections retracted.

FIG. 7 is an enlargement of a portion of FIG. 6, with all core-engagers except one removed for clarity.

FIG. 8 is a lateral cross section of the shaft of FIG. 6 showing the core-engagers extended.

FIG. 9 is a cross section taken along 9—9 of FIG. 7.

FIG. 10 is a cross section of a portion of a third shaft showing a conical core-engaging-actuator retaining member.

Figure 1:
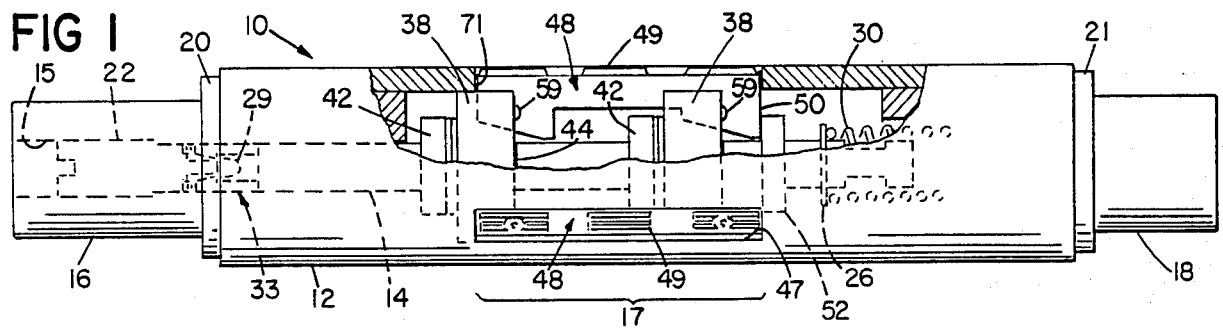
FIG. 1 is a perspective view, partially broken away, of a first expansible shaft showing the engaging sections retracted.

Structure:

Referring now to FIGS. 1–5, expansible shaft 10 is formed from a hollow cylindrical outer housing 12, which is generally co-axial with, and surrounds, a central operating rod 14. Mounting arbors or journals (16 and 18) are fitted partially within the opposite ends of housing 12, and include respective impact collars 20, 21 which engage the opposite axially-facing ends of the housing. In the embodiment shown, shaft 10 includes one core engagement section 17, substantially centered along the length of the shaft.

Figure 5:
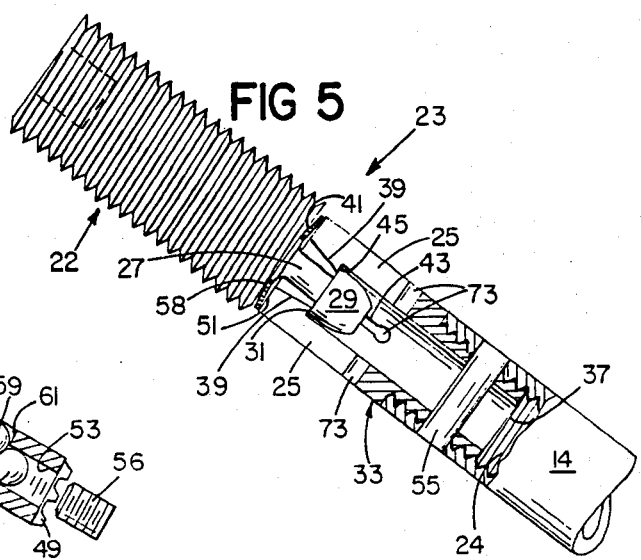
FIG. 5 is an enlargement, partially in section, of components of the shaft of FIG. 1.

A cylindrical bore 15 extends coaxially through journal 16. The outer (left as seen in FIG. 1) half of bore 15 is threaded and engages the outer, co-operatively threaded surface of drive screw 22 of rod-actuator 23. As best shown in FIG. 5, rod-actuator 23 comprises, in addition to drive screw 22, a socket 33 flexibly attached to screw 22 as described below.

A connecting shaft 27 protrudes coaxially from the axially inward end 51 of drive screw 22, and terminates at its inward end in a generally mushroom shaped head 29. The outer end of head 29 includes a flat annular surface 31 perpendicular to the axis of shaft 27 and facing towards screw 22. The diameter of connector shaft 27 is about 1/16 inches less than the maximum diameter of head 29; thus, the difference between the inner and outer diameters of surface 31 is 1/16 inch.

Socket 33 is a hollow cylinder, one end of which is threaded and engages operating rod 14 and the other end of which is snapped around connector shaft 27 and head 29. As shown, four slots 43 extend through the wall of socket 33 and extend axially from the outward end 41 of socket 33 to about midway its length, terminating in stress-relieving drilled holes 73. Slots 43 are equally spaced and provide four stiff fingers 25, each subtending an arc of about 90°. At the end of each finger 25 nearest end 41 is a radially inward projection 39, the inner surface of which is beveled outwardly toward end 41 and the axially inner end of which defines an annular step 45. Projections 39 of fingers 25 are sized so that the projections snap over head 29, providing clearance with the periphery of shaft 27 but with annular steps 45 engaging the sides and end 31 of head 29. When the socket 33 end screw 22 are so snapped together, the adjacent ends 51, 41 are closely adjacent, but not in contact with, each other. A belleville spring washer 58 is seated, in slight compression, in the gap between end 41 of socket 33 and the axially inward end 51 of the threaded section of drive screw 22, and biases the screw 22 and socket 33 axially apart. As will be evident, the screw and socket are free both to rotate, and slightly to pivot axially, with respect to each other.

In assembly, head 29 is axially forced past projections 39 of fingers 25. The outer surface of head 39 forces fingers 25 radially outward until head 29 clears the ends of projections 39, at which point the fingers snap into postion behind it.

As indicated, the axially inner end 37 of socket 33 is externally threaded and engages a co-operatively sized and threaded cylindrical cavity 24 in the end of rod 14. Once screw 22 and socket 33 have been snapped together, the entire actuator 23 is screwed into rod 14, a hole is drilled radially through the threaded together end 37 and rod 14, and a pin 55 is driven through the hole to hold everything tightly in place.

Operating rod 14 extends centrally from its end cavity 24 engaging socket 33, along the axis of housing 12 to a cylindrical recess 70 in the journal 18 at the far end of shaft 12. As shown, a travel adjusting cap screw 32 is threaded coaxially into the end 19 of rod 14 and is there held in place by jam nut 28. Jam nut 28 also holds stop washer 26 tightly in place against the rod end. A helical spring 30 is mounted within recess 70 and coaxially surrounds cap screw 32. One end of the spring engages a thrust washer 36 and belleville spring washer 34 (Associated Spring Co. Catalog No. 61125-053) at the base of cavity 70; the other end of the spring engages stop washer 26.

Each core engaging section 17 includes two axially-spaced spider cams 38, each of which is mounted coaxially on rod 14, and three circumferentially-spaced, axially-extending core engagers 48, each of which extends through a respective radially-extending opening 71 in the cylindrical wall of housing 12. The spider cams 38 are identical to each other, and each defines three circumferentially-spaced, inclined cam surfaces 40. In the illustrated embodiment, cam surfaces 40 are inclined at an angle (measured relative to the axis of rod 14 and, as shown in FIG. 2, inclined downwardly from the end 35 of the cam 38 nearer drive screw 22) of about 13°; and the cam surfaces, core engages 48, and openings 71 are all spaced at 120° intervals around the axis of the shaft.

Each spider cam 38 is mounted between a shaft collar 42 (at end 35 of the spider cam 38) and a retainer ring 44 (at the other end 72 of the cam). Two belleville spring washers 46 (Associated Spring Co. Catalog No. B1500-060) are mounted in series between and engaging collar 42 and cam end 35.

Figure 2:
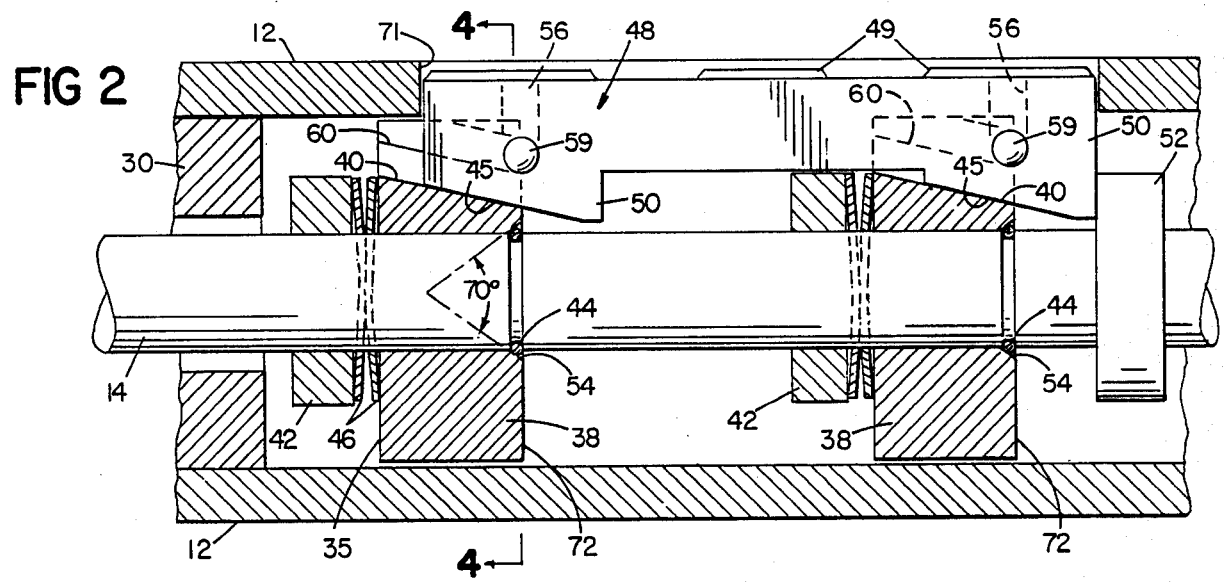
FIG. 2 is an enlargement of a portion of FIG. 1, with all core-engagers except one removed for clarity.
Figure 3:
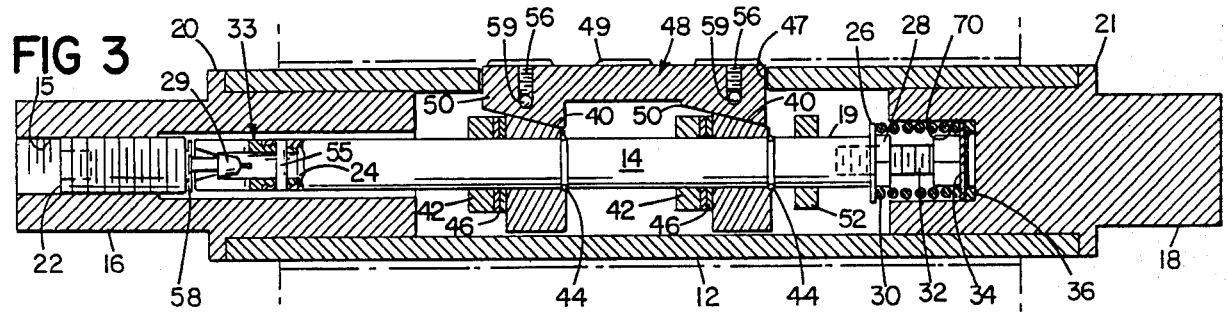
FIG. 3 is a lateral cross section of the shaft of FIG. 1 showing the core-engaging sections extended.

As shown most clearly in FIG. 2, each core engager 48 is an integral metal unit that includes a number of spaced core engaging lugs 49 on its radially outer surface, and a pair of axially-spaced radially inwardly extending cam-followers 50, each of which defines a sloped cam surface 45 arranged to engage a respective cam surface 40 of a spider cam 38. A shaft collar button stop 52 is attached to rod 14 adjacent the end 72 of the spider cam 38 farther from drive unit 22. Stop 52 is positioned on rod 14 such that it will engage the axial end of a cam follower 50 and limit travel of rod 14 towards drive screw 22.

As shown in FIG. 2, a countersink (70° included angle) around the central opening of each spider cam 38 at its end 72 defines an annular surface 54 which is inclined radially outward (as shown at an angle of 35° relative to the axis of the shaft) toward retainer 44, and which contacts and is sufficiently deep entirely to receive and overlie retainer 44. Retainer 44 is a discontinuous ring 0.062 inches in diameter, seated in a groove 1/32 inch deep (i.e, about half the ring diameter) in rod 14.

Figure 4:
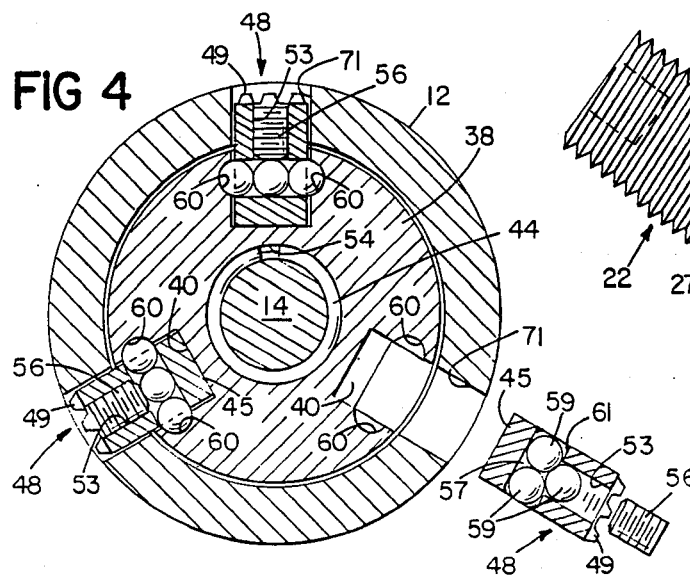
FIG. 4 is a cross section taken along 4—4 of FIG. 2.

Also shown in FIG. 4 is the structure which couples cam-followers 50 to spider cams 38. Each cam-follower 50 has a threaded central radial bore 53 about 0.210 inch in diameter, which joins at its radially inward portion to a cross-bore 57, also about 0.210 inch in diameter. Cross-bore 57 extends through cam follower 50, and its end openings 61 have been narrowed to about 1/16 inch diameter by peening over the ends of the cross-bore. Guide slots 60 are provided in spider cams 38, on each side of, parallel to, and slightly above each cam surface 40, aligned with cross-bore 57. Each cam follower 50 is about ⅛ inch wide; and each slot 60 is about 1/16 in. deep. As shown, cam followers 50 are held in place in spider cams 38 by three metal balls 59, each 0.208 in. in diameter. When the cam followers 30 are seated on cam surfaces 40, all three balls 59 will fit side-by-side in bores 57, with the outer portion of a ball fitted within each of guide slots 60. A screw 56, inserted in each bore 53, presses down on the centrally located ball and holds it in place in alignment with the two side balls 59. As will be seen, the distance of each of the two side balls 59 extends through a respective opening 61 into the respective guide slot 60 associated with that opening is less than the ball radius and, preferably is about ½ the ball radius.

In assembly, the balls are inserted into a bore 53, when the cam-followers 50 are at least partially in place. When the cam follower or cam surfaces 45 are fully seated on cam surfaces, screw 56 is tightened down on the center ball, insuring that the two side balls 59 extend into guide slots 60, thus anchoring the core follower member in place on the spider cam.

OTHER EMBODIMENTS

FIGS. 6–9 show an alternate shaft 110, essentially similar to that of FIGS. 1–5, but having a different method of coupling the actuating screw to the central rod and showing multi-piece core-engagment members. To the extent that elements in FIGS. 6–9 correspond to their counterparts in FIGS. 1–5, those elements have been given corresponding numbers.

Turning first to the system for coupling the actuating screw 122 to rod 114, as shown in FIGS. 6–9 a threaded cylindrical cavity 115 extends coaxially through journal 16. The outer (left as seen in FIG. 6) half of cavity 115 is threaded and engages an activating screw 122, which in turn abuts ball bearing 123 seated in a cavity 124 in the adjacent end of rod 114. Cavity 124 has a depth slightly greater than the radius of bearing 123, and surrounding portions of the cavity lip are peened over to overlap the bearing surface and hold it in place within the cavity. Operating rod 114 extends axially from adjacent activating screw 122 along the axis of housing 12 and is seated in cylindrical recess 70 as described above with reference to the embodiment of FIGS. 1–5.

The core-engagers of the FIGS. 6–9 embodiment is shown most clearly in FIG. 9. A pair of axially-spaced cam followers 150 are secured to the underside of each core engager 148, adjacent the opposite ends thereof. The inwardly-facing end of each cam follower 150 defines a sloped cam surface 145 arranged to engage a respective cam surface 140 of spider cam 138. Screws 156 are recessed in core engagers 148 and extend radially inwardly into threaded central bores 153 in cam followers 150. Each central bore 153 has a drilled lateral opening 161 which extends from the bore 153 to the exterior of the cam follower and accomodates a guide pin 159. A corresponding guide slot 160 is provided in each spider cam 138, parallel to, slightly above, and on one side of each of each cam surface 140. The guide pin 159 of each cam follower 150 fits within the guide slot 160 associated with the particular spider cam surface 140 that the cam follower cam surface 145 engages. Before assembly of core engagers 148 to cam followers 150, and of the cam followers to the spider cams 138, the outer end of each guide pin 159 is flush with the side of its cam followers 150, and the pin extends into the respective cam follower bore 153. Screws 156 have pointed ends, and, as the screws are tightened during assembly, they force the guide pins outwardly through the lateral openings 161 and into slots 160, thus anchoring the cam-follower/engaging-member assembly into the spider cam slots.

Finally, FIG. 10 shows a third shaft, similar in most respects to the shafts of FIGS. 1–9, but using a frusto-conical retaining collar 244 in place of retaining ring 44. Collar 244 comprises an annular ring, the outer surface of which is inclined at an angle of 15° to its axis, cut into two halves 262. Each collar half 262 is seated in a 1/32 inch deep groove 263 in rod 214, and the inner diameter of the ring from which halves 262 are cut is substantially equal to the outer diameter of the grooved portion 263 of the rod. The two halves are held in place by a Spirolox-brand spring ring 265 which surrounds them and is seated in a 1/32-inch deep groove in the outer surfaces of collar halves 262. As shown, the countersink of end 272 at the spider-cam-engaging collar 244 has an included angle of 30° (i.e., annular surface 254 is inclined at an angle of 15°) to mate smoothly with the collar. The depth of the countersink is such that it will receive and engage about half of collar 244.

Other embodiments will include a plurality of axially-spaced core engagement sections 17, the particular number of sections included in any particular shaft depending largely on the axial length of the core the shaft is intended to support. In shafts with multiple core engagement sections, adjacent sections may be aligned or they may be circumferentially staggered with respect to each other so that the shaft housing openings 71 of the adjacent sections are not axially aligned (e.g. are displaced 60° with respect to each other). Additionally, each spider cam (except the two end cams) may support the cam followers of the core engagers of two longitudinally adjacent core engagement sections, in which case the internal spider cams will each have six cam surfaces spaced 60° apart, and the core engagers of the two adjacent engagement sections will be coupled to alternate cam surfaces on a given spider cam.

OPERATION

FIG. 1 shows the shaft with core engagers 48 in the retracted position. Drive screw 22 is withdrawn (to the left as shown), and the rod 14 is biased towards the drive screw 22 by return spring 30. The extent to which rod 14 is free to move to the left is limited by stop 52, which, as shown in FIG. 2, abuts the side of a cam follower 50 preventing further rod movement. In the fully-retracted position, the cam engagers 48 are at their radially inner-most position, with lugs 49 flush with or slightly within the cylindrical outer surface of housing 12, and the cam follower cam surfaces 45 engage the lower (radially inner) ends of spider cam surfaces 40. Retainer rings 44 couple cams 38 to rod 14, ensuring movement of the cams as the rod is moved. The distance between stop 52 and the retainer ring 44 of the adjacent cam 38 is less than the axial length of cam followers 50, thereby preventing the cam followers from sliding off cam surfaces 40.

To extend core engagers 48 past the perimeter of housing 12 so that they will engage the core of a roll placed on the shaft, drive screw 22 is tightened (i.e., rotated clockwise, moving it and rod 14 to the right as shown in the figures. Such movement forces spider cams 38 to the right, driving cam followers 50 up spider cam surfaces 40 and in turn forcing core engagers 48 radially outward to the extended position shown in FIG. 3. The total travel of cams 38 is about ¼ inch. In practice, the amount of expansion obtained will depend on the diameter of the surrounding core and the amount of force applied to drive unit 22. Maximum possible expansion is achieved when return spring 30 has been fully compressed and cap screw 32 has flattened belleville washer 34 against thrust washer 36.

To retract core engagers 48 and release the core, drive unit 22 is rotated counterclockwise and moves the rod to the left as shown in the figures, reversing the above-described operation. Ordinarily, return spring 30 aids the leftward rod movement, but even if spring 30 fails, and mechanical interference of some sort hinders the movement of the rod, drive screw 22 is mechanically attached to rod 14, and itself provides the necessary positive return (i.e., leftward in the Figs.) force.

When core engagers 48 tightened into engagement with a surrounding core, three sets of springs continuously load drive screw 22 (biasing it to the left as shown) and help insure that vibrations and the like will be damped out and that the drive screw will not loosen and retract; belleville washer 58 forces drive screw 22 axially away from socket 33; belleville washers 46 force shaft collar 42 (and hence rod 14) leftward; and a leftward force also is provided by spring 30. In addition to damping vibration and loading device screw 22, washer 58 takes up play in the joint between screw 22 and a socket 33.

The operation of the shafts of FIGS. 6–10 is essentially similar to that described above for the shaft of FIGS. 1–5; however, the ball-coupling of screw 122 to shaft 114 does not provide positive retraction of the rod. The ball coupling is advantageous, however, in that the area of coupling contact between screw 122 and ball bearing 125 in rod 114 is small and effectively constant, regardless of bending of the shaft. Such point contact largely eliminates the potentially serious problem of rod rotation being transmitted to screw 122 (which could retract the screw and permit core engagement members 48 to retract also) during use.

Various other features of the shaft provide for efficient operation under relatively harsh operation conditions, such as the rapid rotation of the shaft when it is under a heavy load which may cause considerable flexing Specifically, the direct coupling between drive screw 22, rod 14, and engagers 48 transmits significant force to the engagers and provides a high load-carrying capacity. Further, the use of belleville washers to between collars 42 and their respective spider cams 38 permits slight variations in axial displacement of the two cams 38 of a core engagement section 17, thereby permitting one end of a core engagement member 48 of an engagement section to expand slightly farther than the other so that the member 48 will conform to the core of the roll being supported even though that core may be slightly irregular or the shaft bowed.

Similarly, the combination of both return spring 30 and a belleville washer 34 permits a person tightening the shaft to "feel" the increased resistance of the latter as full expansion is approached.

What is claimed is:

1. In an expansible shaft comprising
   an axially-extending outer housing,
   an operating rod mounted coaxially of said housing and arranged for movement axially relative to said housing,
   a core engager movable radially relative to said housing and said operating rod between an expanded position in which said core engager extends beyond the outer wall of said housing and a retracted position in which said core engager is positioned radially within said expanded position thereof, and
   an actuator mounted on said rod and arranged to cause said core engager to move towards said expanded position in response to movement of said rod axially relative to said housing,
   that improvement wherein:
   said actuator includes a bore through which said rod extends and having adjacent one end thereof a countersink surrounding said bore and defining a generally inwardly facing annular surface inclined relative to said rod at an angle of not more than 45°; and,
   a generally annular retaining member is mounted in a circumferential groove in the outer surface of said rod in position for engaging said surface of said recess of said actuator,
   whereby when said actuator is forced relative to said rod towards said retaining member interaction between said retaining member and said surface of said recess of said actuator limits said movement and causes application of radially inwardly directed force on said retaining member.

2. The shaft of claim 1 wherein said angle is in the range of 15 to 35 degrees.

3. The shaft of claim 1 wherein said retaining member is a discontinuous ring.

4. The shaft of claim 1 wherein said retaining member comprises a collar, the outer peripheral surface of which is inclined relative to said shaft at an angle substantially equal to the angle of said surface of said recess of said actuator to cooperate with said actuator surface.

5. The shaft of claim 4 wherein said collar comprises two pieces each extending about 180° circumferentially of said rod and maintained in position within said groove by a ring generally encircling said pieces.

6. In an expansible shaft comprising
   an axially-extending outer housing,
   an operating rod mounted coaxially of said housing and arranged for movement axially relative to said housing,
   a core engager movable radially relative to said housing and said operating rod between an expanded position in which said core engager extends beyond the outer wall of said housing and a retracted position in which said core engager is positioned radially within said expanded position thereof, and
   an actuator mounted on said rod and arranged to cause said core engager to move towards said expanded position in response to movement of said rod axially relative to said housing,
   that improvement wherein:
   said actuator includes a bore through which said rod extends and having adjacent one end thereof a recess extending radially outward of said bore and defined at least in part by a surface inclined relative to said rod; and,
   a retaining member is mounted in a recess in the outer surface of said rod in position for engaging said surface of said recess of said actuator;
   whereby when said actuator is forced relative to said rod towards said retaining member, interaction between said retaining member and said surface of said recess of said actuator causes application of radially-inwardly directed force on said retaining member.

7. The shaft of claim 6 wherein said recess in said outer surface of said rod is a circumferential groove in said rod.

8. The shaft of claim 6 wherein said recess of said actuator is a countersink extending generally inwardly from said end of said actuator generally coaxially of said bore.

9. The shaft of claim 6 wherein the angle of said incline is in the range of 15 to 35 degrees.

10. The shaft of claim 6 wherein said recess of said rod is a circumferential groove of predetermined depth and said retaining member is generally annular and extends circumferentially not less than about ninety percent of the circumference of said rod.

11. The shaft of claim 1 wherein said retaining member is a ring the radial height of which is not more than about twice the depth of said groove of said rod in which said ring is mounted.

12. In an expansible shaft comprising
an axially-extending outer housing,
an operating rod mounted coaxially of said housing and arranged for movement axially relative to said housing,
a core engager movable radially relative to said housing and said operating rod between an expanded position in which said core engager extends beyond the outer wall of said housing and a retracted position in which said core engager is positioned radially within said expanded position thereof, and
an actuator mounted on said rod and arranged to cause said core engager to move towards said expanded position in response to movement of said rod axially relative to said housing,
that improvement wherein:
said actuator includes a bore through which said rod extends and having adjacent one end thereof an annular recess surrounding said bore and defining a generally inwardly facing annular surface;
a retaining member is mounted in a circumferential groove in the outer surface of said rod in position for engaging said surface of said recess of said actuator; and,
when said actuator is forced relative to said rod into engagement with said retaining member
(i) said retaining member fits at least partially within said annular recess of said actuator with said annular surface of said recess generally circumfentially surrounding the portion of said retaining member within said recess and
(ii) said annular surface of said recess limits potential movement of said retaining member in a direction radially outwardly relative to said rod to a distance less than the difference between the inner diameter of said retaining member and the diameter of said rod.

13. The shaft of claim 12 wherein the height of said retaining member in a direction generally radially of said rod is not more than about twice the depth of said groove of said rod in which said retaining member is mounted.

14. The shaft of claim 12 wherein said retaining member is a discontinuous ring.

15. The shaft of claim 12 wherein said retaining member comprises a collar the outer peripheral surface of which is inclined relative to said shaft.

16. The shaft of claim 12 wherein said collar comprises two pieces, each extending about 180° circumferentially of said rod and maintained in position within said groove by a ring generally encircling said pieces.

17. The shaft of claim 1 comprising
means for moving said rod axially in one predetermined direction to cause said core engager to move toward said expanded direction, and
wherein:
one axial end of said rod includes a bearing surface defined by a portion of the exterior of a sphere, and
said means for moving said rod in said one predetermined direction engages said bearing surface and is arranged to apply force to said bearing surface in a direction generally parallel to said one predetermined direction.

18. The shaft of claim 17 including a spherical bearing mounted in a recess at said end of said rod and defining said bearing surface.

19. The shaft of claim 18 wherein said recess has a depth measured axially of said rod of not less than the radius of said spherical bearing.

20. The shaft of claim 19 wherein portions of the end of said shaft adjacent said recess extend over the surface of said spherical bearing and retain said bearing within said recess.

* * * * *

UNITED STATES PATENT OFFICE
CERTIFICATE OF CORRECTION

Patent No. 4,469,288        Dated   September 4, 1984

Inventor(s)  Virgil M. Pontes

It is certified that error appears in the above-identified patent and that said Letters Patent are hereby corrected as shown below:

Col. 1, lines 46-47 "U.S. Ser. No. 485,111, filed February 28, 1983" should be --Ser. No. 485,111, filed April 14, 1983--.

Signed and Sealed this

Ninth Day of April 1985

[SEAL]

Attest:

DONALD J. QUIGG

Attesting Officer        Acting Commissioner of Patents and Trademarks